United States Patent
Huang et al.

(10) Patent No.: US 8,136,065 B2
(45) Date of Patent: *Mar. 13, 2012

(54) INTEGRATED PROTOTYPING SYSTEM FOR VALIDATING AN ELECTRONIC SYSTEM DESIGN

(75) Inventors: Thomas B. Huang, San Jose, CA (US); Chioumin M. Chang, San Jose, CA (US)

(73) Assignee: INPA Systems, Inc., San Jose, CA (US)

( * ) Notice: Subject to any disclaimer, the term of this patent is extended or adjusted under 35 U.S.C. 154(b) by 780 days.

This patent is subject to a terminal disclaimer.

(21) Appl. No.: 12/110,233

(22) Filed: Apr. 25, 2008

(65) Prior Publication Data

US 2009/0150839 A1    Jun. 11, 2009

Related U.S. Application Data

(63) Continuation-in-part of application No. 11/953,366, filed on Dec. 10, 2007.

(51) Int. Cl.
G06F 17/50    (2006.01)

(52) U.S. Cl. ......... 716/106; 716/105; 716/111; 716/136

(58) Field of Classification Search .............. 716/105, 716/111, 124, 136, 106; 703/23
See application file for complete search history.

(56) References Cited

U.S. PATENT DOCUMENTS

| | | | |
|---|---|---|---|
| 6,080,204 A | 6/2000 | Mendel | |
| 6,389,379 B1 | 5/2002 | Lin et al. | |
| 6,678,645 B1 * | 1/2004 | Rajsuman et al. | 703/20 |
| 6,701,491 B1 | 3/2004 | Yang | |
| 7,107,567 B1 | 9/2006 | LeBlanc | |
| 7,480,609 B1 | 1/2009 | Cavanagh et al. | |
| 2004/0153308 A1 | 8/2004 | McMillan | |
| 2005/0114113 A1 * | 5/2005 | Quayle et al. | 703/25 |
| 2005/0114809 A1 | 5/2005 | Lu | |
| 2006/0184350 A1 | 8/2006 | Huang | |

OTHER PUBLICATIONS

Kim, Namseung et al. "Virtual Chip: Making Functional Models Work on Real Target Systems" Design Automation Conference, Jun. 15, 1998, XP010309233, ISBN: 978-0-89791-964-7, pp. 170-173.

Lee, Seungjong et al., "Interface Synthesis between Software Chip Model and Target Board" Journal of Systems Architechture, Elsevier Science Publishers BV., Amsterdam, NL vol. 48, No. 1-3, Sep. 1, 2002, pp. 49-57.

(Continued)

*Primary Examiner* — Vuthe Siek
(74) *Attorney, Agent, or Firm* — Edward C. Kwok; Haynes and Boone, LLP (57) ABSTRACT

An integrated prototyping system (IPS) is proposed for verifying and validating an electronic system design (ESD) with hierarchical design elements (HDEs). The IPS has: a) A reprogrammable logic device (RPLD) having an emulation timing base and an RPLD-interface for programming and simulating HDEs under validation while transacting exchanging vectors. The RPLD is also switchably coupled to numerous external peripheral electronic devices (PED), b) An EDA simulator for simulating then verifying selected HDEs while transacting exchanging vectors. The EDA simulator also has a simulator interface; and c) An IPS controller bridging the RPLD and the EDA simulator. The IPS controller has an IPS executive for progressively verifying and validating the ESD. The IPS executive further includes a co-emulation software for jointly and simultaneously running the RPLD and the EDA simulator with an event-based synchronization scheme for interchanging exchanging vectors on demand between the RPLD and the EDA simulator.

29 Claims, 10 Drawing Sheets

OTHER PUBLICATIONS

PCT International Search Report for Int'l. App. No. PCT/US2008/083003, dated Mar. 12, 2009, 4 pages.
PCT Written Opinion of the International Searching Authority for Int'l. App. No. PCT/US2008/083003, dated Mar. 12, 2009, 6 pages.
PCT International Search Report for Int'l. App. No. PCT/US2008/083009, dated Mar. 12, 2009, 4 pages.
PCT Written Opinion of the International Searching Authority for Int'l. App. No. PCT/US2008/083009, dated Mar. 12, 2009, 5 pages.

* cited by examiner

INTEGRATED PROTOTYPING SYSTEM FOR VALIDATING AN ELECTRONIC SYSTEM DESIGN

CROSS REFERENCE TO RELATED APPLICATIONS

The present invention is a Continuation-In-Part (CIP) of copending U.S. patent application ("Copending Application"), entitled "Method of Progressively Prototyping and Validating a Customer's Electronic System Design," by Thomas B. Huang and Chioumin M. Chang, filed on Dec. 10, 2007, Ser. No. 11/953,366, and assigned to "INPA Systems, Inc. The Copending Application is hereby incorporated herein by reference in its entirety for all purposes.

FIELD OF INVENTION

The present invention relates generally to design/validation apparatus and method for designing complex electronic circuits. In particular, the present invention is directed to a prototyping system for verifying and validating electronic circuit designs that are particularly applicable to an ultra large scale integrated circuit type electronic circuit.

BACKGROUND OF THE INVENTION

As their level of integration continues its advancement, many complex electronic logic systems can now be implemented on a single integrated circuit (IC). Such an IC, often known as "system on a chip (SoC)" or "ultra large scale integrated circuit (ULSI)" in the art, includes a number of complex components (e.g., micro-processor, digital signal processor, peripheral and memory controllers), many of which may be individually obtained as "off-the-shelf" electronic circuit designs from numerous vendors in the market. These electronic circuit designs are known as "IPs[1]" to those skilled in the art.

[1] The term "IP" stands for "intellectual property." Designers of these electronic circuits provide the designs to their customers in the form of data files which are readable by popular electronic design automation (EDA) tools. The customers of these designers then integrate these "IPs" into their own circuit designs. As an IP vendor does not provide a manufactured article here—the electronic deign is typically provided as design data represented in electronic form (e.g., stored in a storage medium, such as a compact disk, or as a stream of bits downloaded from a server via the Internet)—it has become customary in the art to refer to such electronic circuit design products as "IPs".

In U.S. Pat. No. 6,701,491 entitled "Input/output probing apparatus and input/output probing method using the same, and mixed emulation/simulation method based on it" by Yang, an interactive environment is disclosed for IC designers to emulate integrated circuits back and forth between a hardware accelerator and a software simulator. Correspondingly, memory states and logic storage node states are swapped between the accelerator and the simulator. A complete context switch is performed to create a time shared environment on the hardware accelerator so that it can be shared among multiple IC designers. In general, multiple accelerators can be interconnected to multiple simulators and multiple workstations to allow multiple designers to allow interactive operations and to shift back and forth between hardware emulation and software simulation.

A mixed emulation/simulation method is also disclosed by Yang. Here, input/output hardware probing is performed by emulation to verify correct operations. At least one semiconductor chip is used which implements an extended design verification target circuit. The extended design verification circuit includes an IOP-probing supplementary circuit in addition to the design verification target circuit. The IOP-probing supplementary circuit includes an input/output probing interface module. An input/output probing system controller generates the IOP-probing supplementary circuit for the design verification target circuit. The extended design verification target circuit is implemented in semiconductor chip(s) mounted on a prototyping board or is implemented with a hardware description language (HDL) code which defines the behavior of the IOP-probing supplementary circuit. Emulation and simulation are then performed in turn more than one time as necessary. For these emulations and simulations, state information is exchanged in an automated manner between a prototyping board and a simulator. Furthermore, the state information is exchanged in an automated manner between the prototyping board and the simulator as a result of the IOP-probing supplementary circuit-based input/output probing. With the IOP-probing supplementary circuit, another mixed emulation/simulation process is also disclosed whose operating mode is conditionally based upon a predetermined switching condition queue ordered according to time. Simulation and emulation are performed according to the switching condition queue during the process until the queue becomes empty.

In U.S. Pat. No. 6,389,379 entitled "Coverification system and method" by Lin, et al, a coverification system and method are disclosed. The coverification system includes a reconfigurable computing system and a reconfigurable computing hardware array. The reconfigurable computing system includes a CPU and a memory for processing modeling data of the entire user design in software. In some embodiments, a target system and external I/O devices are not necessary since they can be modeled in software. In other embodiments, the target system and external I/O devices are coupled to the coverification system for speed and to use actual data, rather than simulated test bench data.

The disclosed coverification method by Lin, et al was directing at verifying the proper operation of a user design. In Lin's apparatus, the user design is connected to an external I/O device. The method involves generating a first model of the user design in software for simulation, generating a second model of at least a portion of the user design in hardware and then controlling the second model in hardware with the first model in the software. More specifically, controlling further involves synchronizing the data evaluation in the first model in software and in the second model in hardware with a software-generated clock. For debugging, the method further involves simulating selected debug test points in software, accelerating selected debug test points in hardware and controlling the delivery of data among the first model in software, the second model in hardware, and the external I/O device so that the first model in software has access to all delivered data.

In the prior art, designing, debugging, verifying and validating a system that includes a user design that is integrated with one or more third party IPs is generally difficult, as the user often starts with a behavior description or a simulation model of the IP, which provides incomplete control over the IP's logical behavior at the interfaces between the user design and the IP. In addition, a user design that includes a behavior simulation model, logic gates and embedded software is extremely difficult to create and for which to isolate system faults. For example, it is difficult to discover errors within an audio or video output data stream unless the user can "hear" or "see" the rendered audible and/or visual results. A conventional method of design verification and validation prototypes the system behavior in an electronic design automation (EDA) simulation environment to verify the numerous interface functions. Then, the user separately embodies the EDA-simulated logic into a custom application reference board-based validation environment to "hear" or "see" the audible and/or visual results. Finally, the user prototypes (implementing) the logic into packaged electronic devices to meet the product level electrical specification. During the conventional process of design verification and validation, for example, incorrectly behaving output signals of an audio or video decoder due to logic, algorithmic or software programming error of the user design may manifest themselves in the form of unpredictable audio or display behavior. For a complicated system, such an unpredictable behavior potentially caused by logic, algorithmic or software programming error is extremely difficult to diagnose and isolate in either the EDA simulation or the application reference board environment separately. Therefore, a design verification and validation system with associated software that allows the user to integrate his EDA simulator directly with his printed circuit board (PCB) prototype to quickly isolate/fix design faults, then quickly verifying and validating his PCB prototype in an integrated environment is highly desirable. In essence, such a design verification and validation system would provide the user with a high throughput, end-to-end solution from design verification to system validation.

SUMMARY OF THE INVENTION

An integrated prototyping system (IPS) allows a user to verify and validate an electronic system design (ESD) with design data represented by hierarchical design elements (HDEs). Each HDE has its corresponding test bench and the HDEs further interact with one another according to a predefined functional validation specification. The IPS has:
  a) A reprogrammable logic device (RPLD) having an emulation timing base as its operating timing base and an RPLD-interface for configuring, programming, controlling and monitoring numerous programmed HDEs under validation on the RPLD while receiving and outputting corresponding streams of exchanging vectors. The RPLD is also switchably coupled to a number of external peripheral electronic devices (PED).
  b) An EDA simulator for reading the design data, simulating then verifying, while receiving and outputting corresponding streams of exchanging vectors, selected HDEs in conjunction with their test benches. The EDA simulator also has a simulator interface for controlling its execution while receiving and outputting the exchanging vectors.
  c) An IPS controller bridging the RPLD and the EDA simulator through the RPLD-interface and the simulator interface. The IPS controller has an IPS executive for progressively verifying and validating the design data by:
    c1) Partitioning the ESD into already validated HDEs and a set of not yet verified HDE candidates.
    c2) Verifying, programming into the RPLD and validating the HDE candidates, together with their corresponding PEDs, if applicable, with the EDA simulator in conjunction with the RPLD against the functional validation specification.
    c3) Repeating steps c1) and c2) till all HDEs are verified, programmed and validated in the RPLD.

In a more specific embodiment, the IPS executive progressively verifies and validates the design data according to the design hierarchy of the HDEs.

In a more detailed embodiment, the above step c2) further includes:
  c21) Verifying the unverified HDE candidates with the EDA simulator.
  c22) Programming and testing the just verified HDEs on the RPLD separate from the already validated HDEs on the RPLD.
  c23) Combining the verified and tested HDEs with the already validated HDEs and then programming and validating the result on the RPLD.

In a more detailed embodiment, the RPLD-interface further includes a Vector Processor Interface (VPI) for communication therewith. Correspondingly, the IPS controller further includes a Vector Processor Module (VPM) having a vector processor and VPI driver software for processing exchanging vectors and communicating with both the VPI and the simulator interface. The VPI further includes RPLD configuration interface, cross trigger interface and configurable clock interface. The simulator interface further includes a computer interface for communicating with the VPM.

In a more detailed embodiment, the RPLD includes numerous interconnected field programmable gate arrays (FPGAs), each having its own FPGA attributes, for emulating numerous verified HDEs programmed in them. In another embodiment, the FPGAs form a user's application reference board (ARB). Furthermore, each FPGA has an emulation clocking module, being part of the emulation timing base, for supplying a real-time scalable frequency clock signal, which times the emulation under either one of the following modes:
  a) A simulator-dominate mode wherein each FPGA, while being decoupled from its associated PEDs, co-emulates selected members of HDEs in conjunction with the EDA simulator.
  b) An RPLD-dominate mode wherein each FPGA, while being coupled to its associated PEDs, emulates selected members of HDEs in conjunction with the EDA simulator.

For verifying and validating the HDE candidates, the IPS executive further includes a co-emulation software interacting with the VPM for jointly and simultaneously running the RPLD and the EDA simulator with no time base synchronization in between. However, an event-based synchronization scheme is adopted for interchanging exchanging vectors on demand between the RPLD and the EDA simulator and, accordingly, the vector processor further includes an event detector and a vector generator for detecting relevant events from either HDEs under verification or HDEs under validation, generating and flagging formatted exchanging vectors requested by the co-emulation software. As the emulation timing base corresponds to an emulation throughput much higher than that of the EDA simulator, the event-based synchronization scheme substantially increases the co-emulation throughput from an otherwise time base synchronization scheme.

In a more specific embodiment, the IPS further includes a co-emulation busing mechanism for data busing between HDEs under verification and HDEs under validation. Correspondingly, the co-emulation software further includes:
  1) Generating simulation scripts and exchanging vector acquisition scripts for the HDE candidates to be verified and validated.
  2) Configuring the vector processor and the VPI into proper states.
  3) Initializing the EDA simulator into a proper state and starting simulating the selected HDEs.

4) Using the VPM and via the co-emulation busing mechanism, synchronizing exchanging vectors between the EDA simulator and the RPLD.

5) Converting the exchanging vectors and storing the result in the EDA simulator for later debugging and regression tests. Converting the exchanging vectors further includes separating the exchanging vectors into emulation/simulation signal vectors, internal states, data of observation points and error alarms.

In a more specific embodiment, the FPGAs are switchably coupled to the PEDs and each FPGA is further configured to have an individual Embedded Vector Processor Interface (EVPI) interfacing with the VPI and the emulation clocking module for:
a) Transceiving exchanging vectors through the EVPI itself.
b) Embedding desired Verification IPs (VIPs) and observation points (OBPs) into a problematic area of the verified HDEs under validation on the RPLD to catch faults during a following co-emulation process. For this purpose, the vector processor and the EVPI further include an error annunciator.

In a more specific embodiment:
a) The RPLD-interface further includes an FPGA-programming interface for receiving information that effectuates configuration and programming of the interconnected FPGAs.
b) Correspondingly, the IPS executive includes an FPGA-programming utility that combines HDEs verified by the EDA simulator with HDEs validated by the RPLD into a next set of HDEs to be validated, maps it into configuration and programming information then sends the result through the FPGA-programming interface thus programs the next to be validated HDE set, together with their applicable interconnection to corresponding PEDs, into the numerous FPGAs. The FPGA-programming utility further generates, maps and sends proper configuration information through the FPGA-programming interface, thus programming the EVPI and VPI to effectuate the event-based synchronization for interchanging exchanging vectors. Additionally, while combining the verified HDEs with the validated HDEs, the FPGA-programming utility further embeds the VIPs and OBPs into an area of the HDEs to be validated.

In a more detailed embodiment, mapping the next set of HDEs to be validated into configuration and programming information by the FPGA-programming utility further includes:
a) Generating a top level netlist, having an EDA simulator portion and an RPLD portion, respectively corresponding to HDE interconnections of the EDA simulator and the RPLD.
b) Importing the RPLD netlist portion and partitioning it, if needed, into one or more FPGAs according to their FPGA attributes. This further involves:
b1) Reading the FPGA attributes and the RPLD netlist portion.
b2) Deciding, partitioning and mapping, if needed, the HDEs to be validated into the FPGAs.
c) For each FPGA, reading and embedding its user specified or automatically generated VIPs, OBPs and EVPI then specifying its interconnects.
d) Generating a new FPGA netlist including the individual FPGA designs.

For detecting bugs in the ESD:
a) Upon encountering an exchanging vector indicating an error in the co-emulation process, the error annunciator generates an error alarm.
b) The co-emulation software further includes a runtime debugger coupled to the error annunciator. Upon detecting the error alarm, the runtime debugger would intercept the exchanging vector indicating error from the VPM.

For fixing bugs in the ESD, the IPS executive further includes a debugging utility coupled to the co-emulation software and the FPGA-programming utility for:
a) Extracting the exchanging vector indicating error from the runtime debugger.
b) Analyzing the exchanging vector indicating error, in conjunction with stored exchanging vector data from the EDA simulator, to isolate faults at exchanging vector boundary to accelerate the validation process.
c) Asserting, via the EDA simulator or via the FPGA-programming utility into the RPLD as appropriate, the VIPs and/or the OBPs into an area of the ESD to further isolate faults if needed.
d) Fixing bugs in the ESD, and then using the stored exchanging vector data from the EDA simulator to qualify the associated bug fixes.

These aspects of the present invention and their numerous embodiments are further made apparent, in the remainder of the present description, to those of ordinary skill in the art.

BRIEF DESCRIPTION OF THE DRAWINGS

In order to more fully describe numerous embodiments of the present invention, reference is made to the accompanying drawings. However, these drawings are not to be considered limitations in the scope of the invention, but are merely illustrative.

DETAILED DESCRIPTION OF SPECIFIC EMBODIMENTS

The description and the drawings herein focus on one or more currently preferred embodiments of the present invention and also describe some exemplary features and/or alternative embodiments. The description and drawings are presented for the purpose of illustration and, as such, are not limitations of the present invention. Thus, those of ordinary skill in the art would readily recognize variations, modifications, and alternatives within the scope of the present invention.

Figure 1:
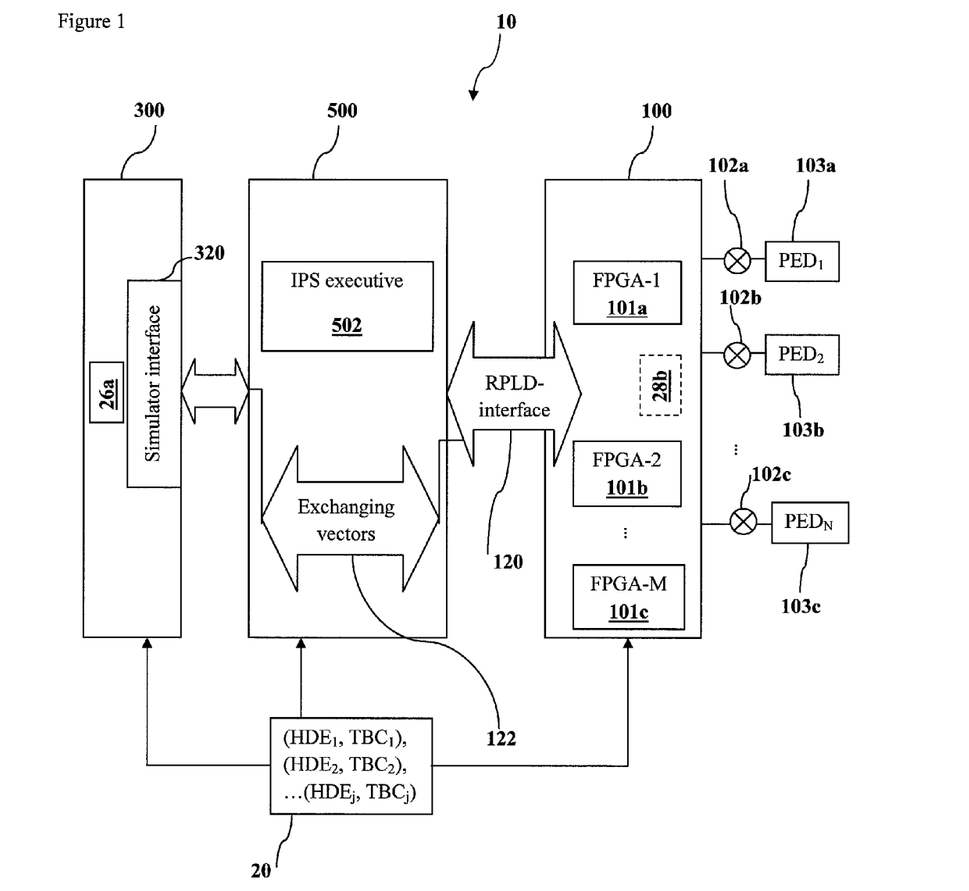
FIG. 1 illustrates an overall top level architecture of an IPS, according to one embodiment of the present invention, including an RPLD, an EDA simulator and an IPS controller.

FIG. 1 illustrates an overall top level architecture of IPS 10, according to one embodiment of the present invention, for a user to verify and validate an electronic system design (ESD) 20 with its design data represented by hierarchical design elements (HDEs). Each HDE includes its own corresponding test bench (TBC). In FIG. 1, the HDEs and their respective associated TBCs are labeled (HDE$_1$, TBC$_1$), (HDE$_2$, TBC$_2$), ..., (HDE$_j$, TBC$_j$). As part of the ESD 20, the HDEs further interact with one another according to a pre-defined functional validation specification.

The IPS 10 includes an RPLD 100 with an RPLD-interface 120 and an EDA simulator 300 with a simulator interface 320. The IPS 10 further includes an IPS controller 500 bridging the RPLD 100 and the EDA simulator 300 respectively through the RPLD-interface 120 and the simulator interface 320. In many applications, the RPLD 100 can be part of a user's application reference board (ARB). The RPLD 100 has a number of FPGAs illustrated as FPGA-1 101$a$, FPGA-2 101$b$, ..., FPGA-M 101$c$. The inter-connection amongst these FPGAs are omitted here to avoid obscuring details. Under control through the RPLD-interface 120, the RPLD 100 is further switchably coupled to numerous external peripheral electronic devices (PEDs): coupling switch-1 102$a$ to PED-1 103$a$, coupling switch-2 102$b$ to PED-2 103$b$, ..., coupling switch-N 102$c$ to PED-N 103$c$. The PEDs may be off-the-shelf components, such as microprocessor, digital signal processor (DSP), dynamic random access memory (DRAM), and hard disk drive (HDD). Each FPGA has its own attributes such as gate map, logic and memory capacity, pin counts, clock sources, etc. Following proper mapping and programming through the RPLD-interface 120, the FPGAs can emulate and then validate any portion or all of the verified but not yet validated ESD 20 under control of the IPS controller 500. Here, an HDE under validation HDE (Vd)$_k$ 28$b$ that is part of the RPLD 100 is illustrated. The HDE(Vd)$_k$ 28$b$ is indicated by dashed lines to signify that its programmed physical location on the RPLD 100 is actually merged with the FPGAs, sometimes even distributed among a number of FPGAs. An emulation timing base of the RPLD 100, being its operating timing base, will be presently described.

The EDA simulator 300 reads the design data of the ESD 20, simulates and then verifies HDEs under verification, such as an illustrated by HDE(Vf)$_j$ 26$a$ that is part of the EDA simulator 300. In general, as many pairs of HDEs under verification on the simulation side (such as the HDE(Vf)$_j$ 26$a$) and HDEs under validation on the simulation side (such as the HDE(Vd)$_k$ 28$b$) must dynamically interact with each other according to the ESD 20, a corresponding set of interacting signals between each pair, called exchanging vectors 122, must be dynamically exchanged in parallel to effect a co-emulation process with high throughput. Example signals of such exchanging vectors 122 include clock signals, emulation signal vector, simulation signal vector, internal states, data in the data path, data of observation points and error alarms. Hence, on the simulation side, the EDA simulator 300 simulates numerous HDEs under verification (like HDE(Vf)$_j$ 26$a$) in conjunction with their test benches while simultaneously outputting and receiving exchanging vectors 122 to/from numerous HDEs under validation (like HDE(Vd)$_k$ 28$b$) by the RPLD 100 on the emulation side. In essence, through the RPLD-interface 120 and the simulator interface 320, the IPS controller 500 configures, programs, controls and monitors numerous HDEs under verification and programmed HDEs under validation while communicating streams of exchanging vectors 122 between them. As a side note, each test bench TBC$_j$ generates test vectors to test its corresponding HDE under verification or its HDE under validation, as the case may be. Thus, the simulator interface 320 also provides a common interface to the HDE(Vf)$_j$ 26$a$ as well as the test benches (TBC$_1$, TBC$_2$, ..., TBC$_j$).

Figure 2:
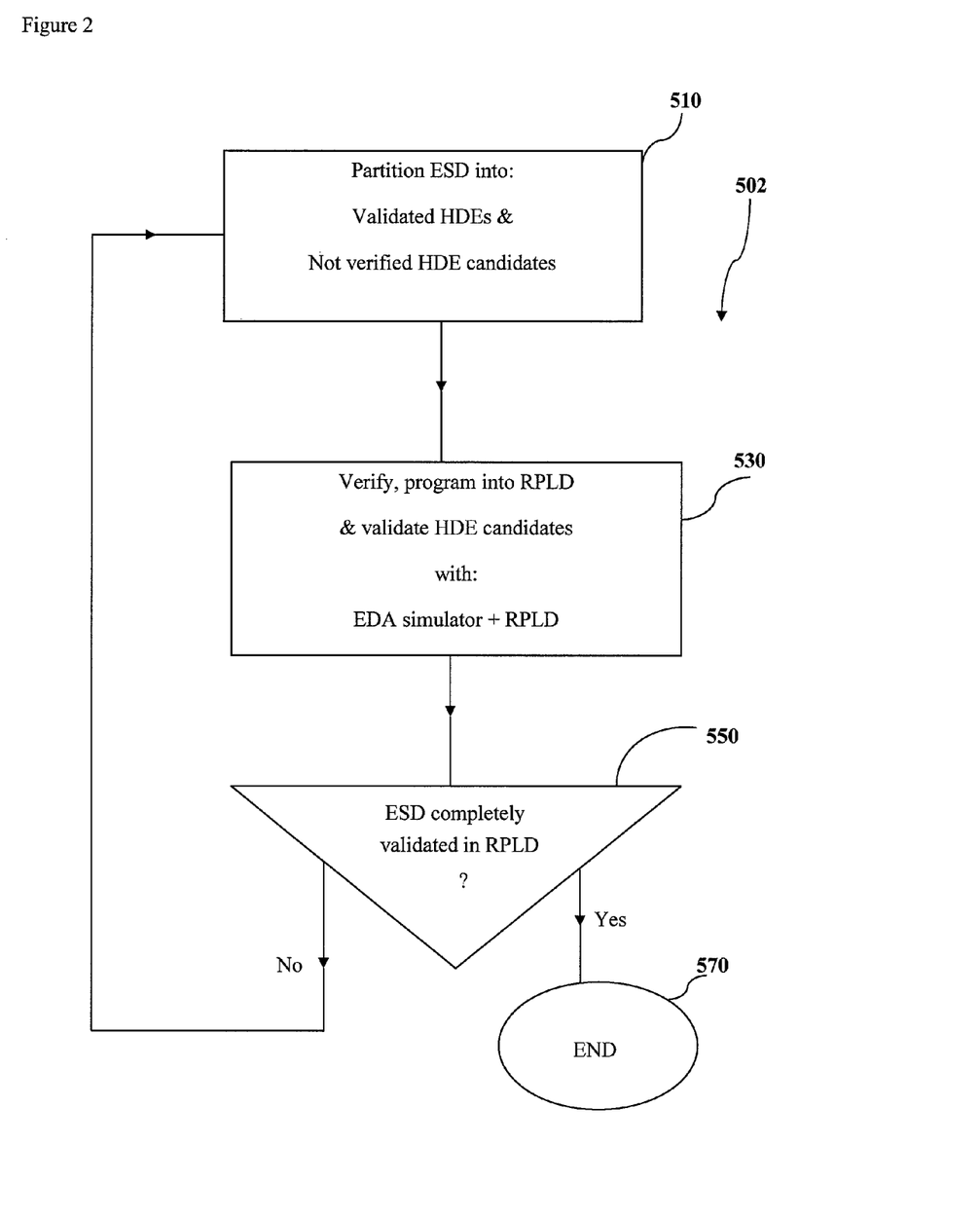
FIG. 2 depicts major process flow steps of an IPS executive in the IPS controller.

The IPS controller 500 has an IPS executive 502 for progressively verifying and validating design data of the ESD 20. As illustrated in FIG. 2, the IPS executive 502 follows the following steps:

In step 510, the IPS executive 502 partitions the ESD 20 into a set of validated HDEs and another set of HDE candidates each has not yet been verified.

In step 530, the IPS executive 502 verifies, programs into the RPLD 100 and validating the HDE candidates, together with their corresponding PEDs if applicable, with the EDA simulator 300 in conjunction with the RPLD 100 against the functional validation specification.

Step 550 first checks to see if all HDEs of the ESD 20 have already been validated. If not the IPS executive 502 resumes iteration from step 510. Otherwise the IPS executive 502 ends at END 570 with all HDEs verified, programmed and validated in the RPLD 100.

Figure 3:
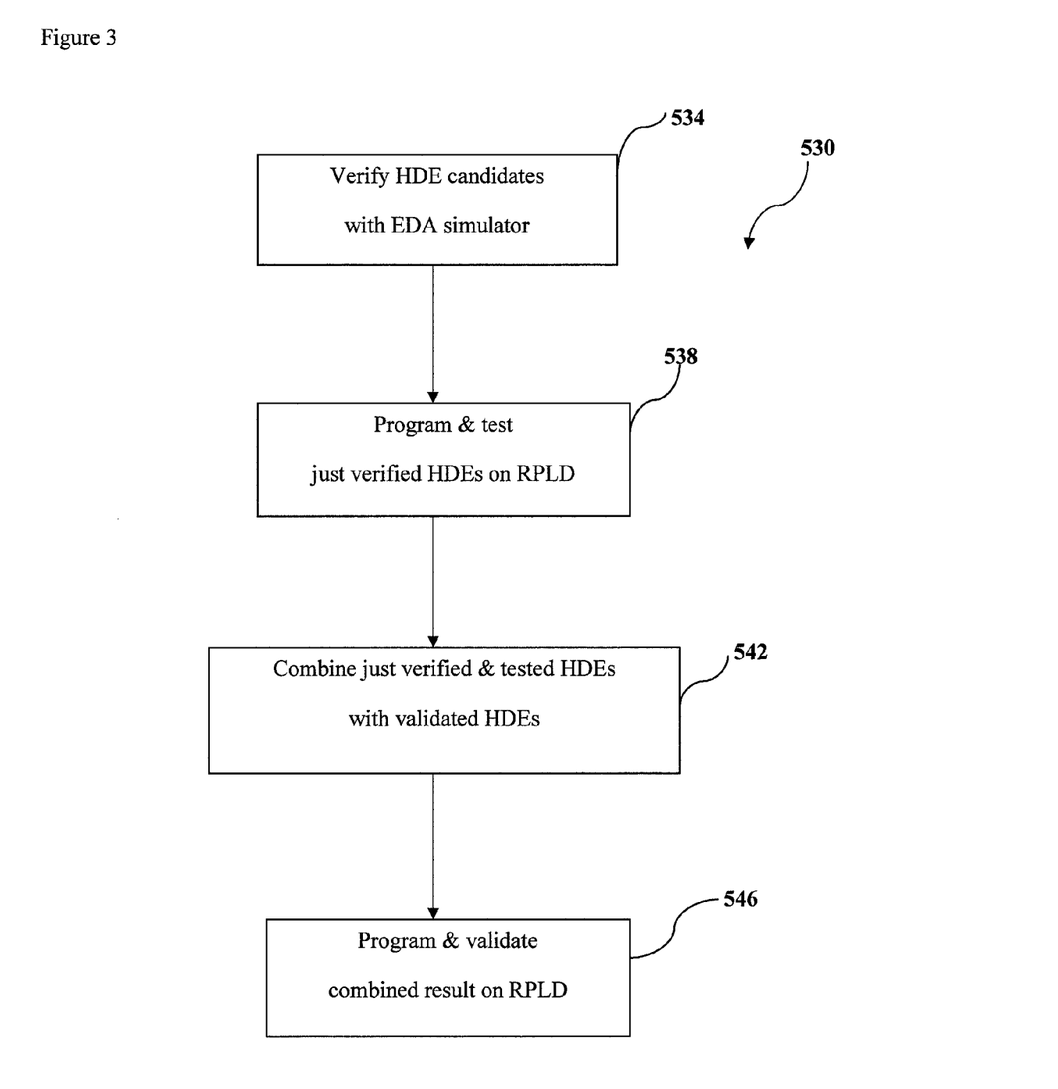
FIG. 3 depicts process flow steps for verifying, programming into the RPLD and validating the HDE candidates with the EDA simulator.

Therefore, the IPS executive 502 verifies then validates the user's ESD 20 with a progressive, joint software/hardware co-emulation process wherein the number of HDEs to be verified progresses from a full set to zero while the number of verified and validated HDEs progresses from zero to a full set. In a preferred embodiment, the IPS executive 502 progressively verifies and validates the ESD 20 according to the design hierarchy of its HDEs. FIG. 3 depicts the next level detailed process flow of step 530 in FIG. 2:

In step 534, the IPS executive 502 verifies the unverified HDE candidates with the EDA simulator 300.

In step 538, the IPS executive 502 programs and tests the just verified HDEs on the RPLD 100 separate from those already validated HDEs on the RPLD 100.

Step 542 combines the just verified and tested HDEs with the already validated HDEs.

Step 546 then programs and validates the combined result on the RPLD 100.

Figure 4:
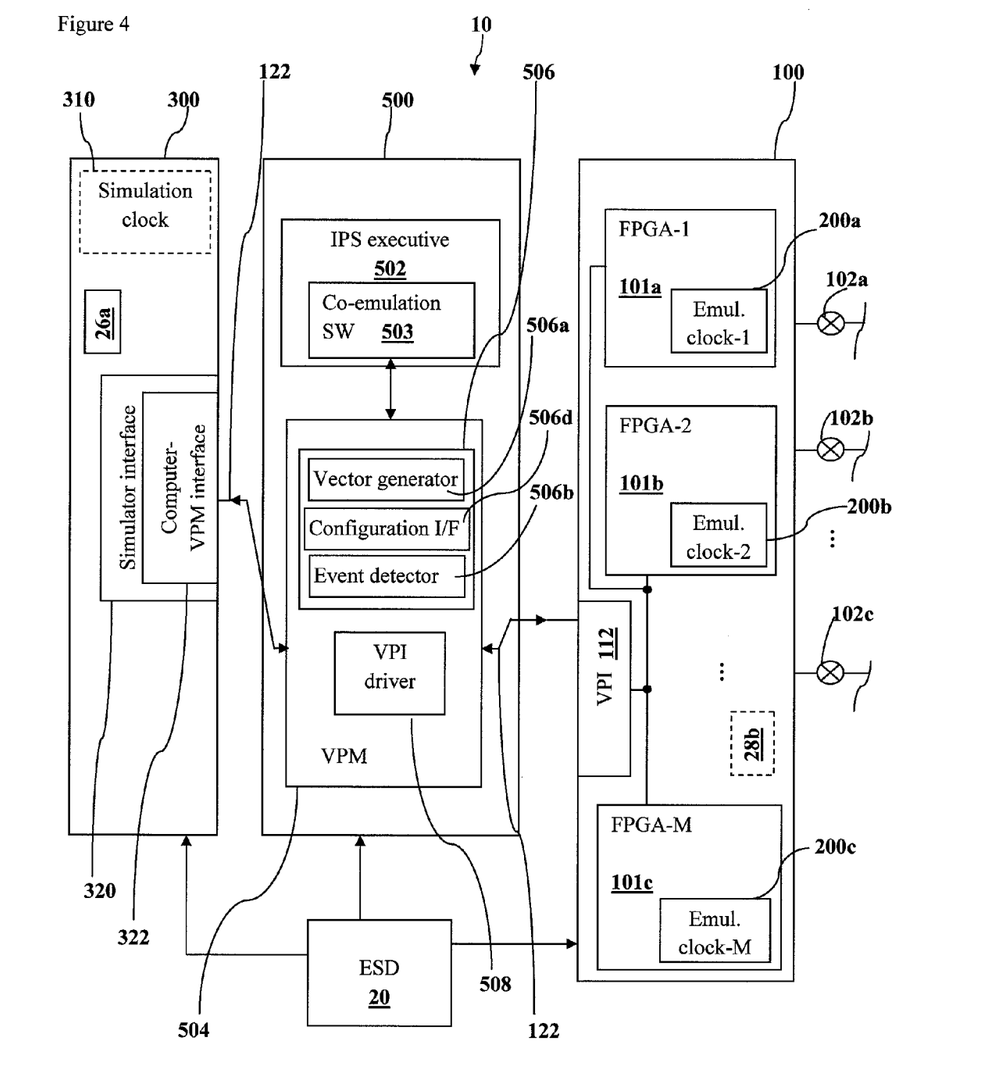
FIG. 4 illustrates further details of the RPLD, the EDA simulator and the IPS controller including, inter alia, emulation clocking modules of the RPLD and a simulation clock signal of the EDA simulator.

FIG. 4 illustrates the next level details of the RPLD 100, the EDA simulator 300 and the IPS controller 500 including, inter alia, numerous emulation clocking modules of the RPLD 100 and a simulation clock 310 of the EDA simulator 300. The emulation clocking modules include an emulation clock-1 200$a$ programmed into FPGA-1 101$a$, emulation clock-2 200$b$ programmed into FPGA-2 101$b$, ..., emulation clock-M 200$c$ programmed into FPGA-M 101$c$. The emulation clocking modules thus form the operating timing base for emulating various programmed HDEs under validation in the RPLD 100. Notice the simulation clock 310 of the EDA simulator 300 is bordered in dashed lines. This is because a simulation clock is not always necessary for operation of the EDA simulator 300. As for example, in simulating an ESD 20 described with a C-model the EDA simulator 300 does not generate a simulation clock 310 per se. A C-model is typically a behavior model written in the "C" programming language. However, regardless of this exception, the equivalent simulation throughput of the software based EDA simulator 300 is typically four-to-six orders of magnitude slower than that of a hardware based emulator such as the RPLD 100. For example, under a 100 MHz emulation clock it takes a 10 ns period to process a vector but it may take 1 ms to process a vector by a simulator. In other words, the emulation clock is 100,000 times faster than the simulation clock.

The RPLD-interface 120 further includes a Vector Processor Interface (VPI) 112 coupled to the FPGAs for external communication. Correspondingly, the IPS controller 500 has a Vector Processor Module (VPM) 504 having a vector processor 506 and a VPI driver 508 software for processing the exchanging vectors 122 and communicating with both the VPI 112 and the simulator interface 320. While not specifically shown here, the VPI 112 also includes a set of RPLD configuration interface, cross trigger interface and configurable clock interface. Thus, as programmed, the frequency of each of the emulation clocks 200a through 200c is real-time scalable via the configurable clock interface of the VPI 112. As the EDA simulator 300 operates in computer software domain while the VPM 504 is embodied in hardware, the simulator interface 320 further includes a computer-VPM interface 322, for example PCI bridge, for communication with the VPM 504.

For verifying and validating the HDE candidates, the IPS executive 502 further includes a co-emulation software 503 interacting with the VPM 504 for jointly and simultaneously running the RPLD 100 and the EDA simulator 300 with no time base synchronization between them. Instead, the co-emulation software 503 effects an event-based synchronization scheme for interchanging the exchanging vectors 122 on demand between the RPLD 100 and the EDA simulator 300. Correspondingly, the vector processor 506 has a vector generator 506a, a configuration interface 506d and an event detector 506b for detecting relevant events from either HDEs under verification (such as $HDE(Vf)_j$ 26a) or HDEs under validation (such as $HDE(Vd)_k$ 28b), generating and flagging properly formatted exchanging vectors 122 requested by the co-emulation software 503. As the throughput of the EDA simulator 300 is slower than that of the RPLD 100, the RPLD 100 performs its hardware emulation at its rated emulation clocking frequency but only momentarily slows down to match the simulation throughput, and to accomplish the necessary transaction of exchanging vectors 122 with the EDA simulator 300. In this way, the IPS 10 can achieve a co-emulation throughput substantially higher than an otherwise time-base synchronization scheme that is limited by the simulation clock 310.

Figure 5:
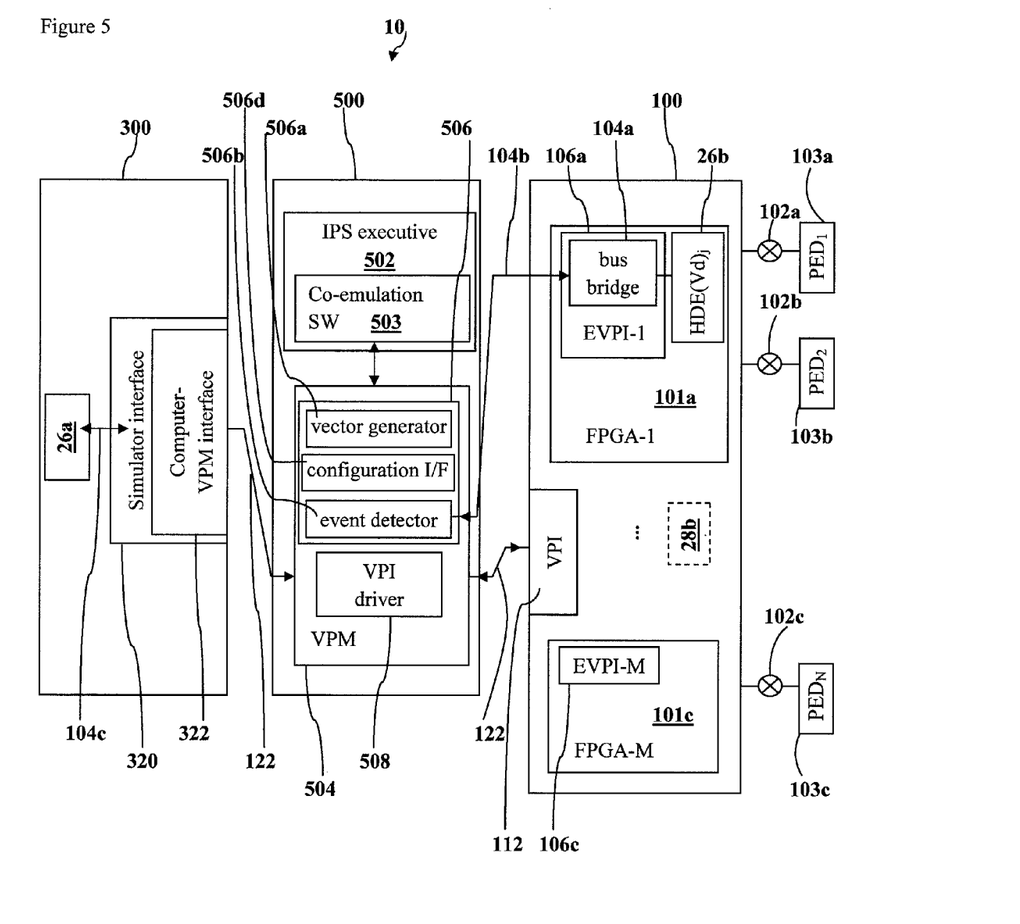
FIG. 5 illustrates further details of an event-based synchronization scheme for interchanging exchanging vectors on demand between the RPLD and the EDA simulator, including a co-emulation busing mechanism.

FIG. 5 illustrates the next level details of the event-based synchronization scheme for transacting the exchanging vectors 122 on demand between the RPLD 100 and the EDA simulator 300, including a co-emulation busing mechanism. As implied before, the FPGAs are part of the RPLD 100 thus are therefore switchably coupled to the PEDs. To insure that the RPLD-interface 120 extends into the individual FPGAs, each FPGA is further configured to have an individual Embedded Vector Processor Interface (EVPI) interfacing with the VPI 112 and the emulation clocking modules. Thus, FPGA-1 101a has an embedded EVPI-1 106a and FPGA-M 101c has an embedded EVPI-M 106c, etc. The EVPIs perform the following functions:

a) Transceiving exchanging vectors 122.
b) Embedding desired Verification IPs (VIPs) and observation points (OBPs) into selected areas of the verified HDEs under validation (such as $HDE(Vd)_k$ 28b) in the individual FPGA to catch faults during a co-emulation process.

To further simplify and accelerate transaction of exchanging vectors 122 between the RPLD 100 and the EDA simulator 300, the IPS 10 further implements a co-emulation busing mechanism for data busing between HDEs under verification (such as $HDE(Vf)_j$ 26a) and HDEs under validation (such as $HDE(Vd)_j$ 26b and $HDE(Vd)_k$ 28b). As illustrated, in one embodiment a bus bridge 104a coupling the $HDE(Vd)_j$ 26b is inserted in EVPI-1 106a and an emulation bus 104b is inserted in the RPLD-interface 120 directly coupling exchanging vectors 122 between the bus bridge 104a and the event detector 506b. On the simulator side, a virtual simulation bus 104c is inserted coupling the $HDE(Vf)_j$ 26a to the simulator interface 320. The co-emulation busing mechanism allows a more direct and faster data busing between $HDE(Vf)_j$ 26a and $HDE(Vd)_j$ 26b. In an even more direct alternative embodiment, the exchanging vectors 122 can be bridged between bus bridge 104a and computer-VPM interface 322. Also, referring to FIG. 4 and FIG. 5, the bus bridge 104a is driven by emulation clock-1 200a, so is the $HDE(Vd)_j$ 26b. With the co-emulation busing mechanism as described, FIG. 5 further illustrates an example of the event-based synchronization scheme for interchanging the exchanging vectors 122. In this example, $HDE(Vd)_j$ 26b consists of a major portion of the ESD 20 and its coupled PED-1 103a consists of a microprocessor and memory. $HDE(Vf)_j$ 26a is a decoder and is a part of the ESD 20 that is under verification. Thus, $HDE(Vf)_j$ 26a is connected to $HDE(Vd)_j$ 26b via the co-emulation busing mechanism. $HDE(Vd)_j$ 26b on the RPLD 100 is running at emulation clock frequency while $HDE(Vf)_j$ 26a on the EDA simulator 300 is only running at simulation clock frequency. The inserted bus bridge 104a in the EVPI-1 106a acts to isolate the emulation environment and the simulation environment from each other. When the microprocessor communicates with the decoder $HDE(Vf)_j$ 26a, a bus request and address command appear on the bus bridge 104a. The bus bridge 104a then sends a flag to the event detector 506b residing in the vector processor 506 and pass the flag on to $HDE(Vf)_j$ 26a of the EDA simulator 300. Upon the HDE $(Vf)_j$ 26a responding to the request, a bus cycle is completed. On the other hand, when the decoder $HDE(Vf)_j$ 26a accesses the co-emulation busing mechanism, the event detector 506b accordingly signals the bus bridge 104a to buffer the transaction and to return a requested value. Notice that when the co-emulation busing mechanism has no activities, the microprocessor and memory can be running at 100 MHz while the decoder can be only running at 10 KHz, for example. In a conventional co-emulation system where the entire design including the emulation hardware is driven by the simulation clock, the emulation hardware could only run at lower than 10 KHz in this case. Thus the overall co-emulation throughput is substantially improved by the present invention.

Figure 6:
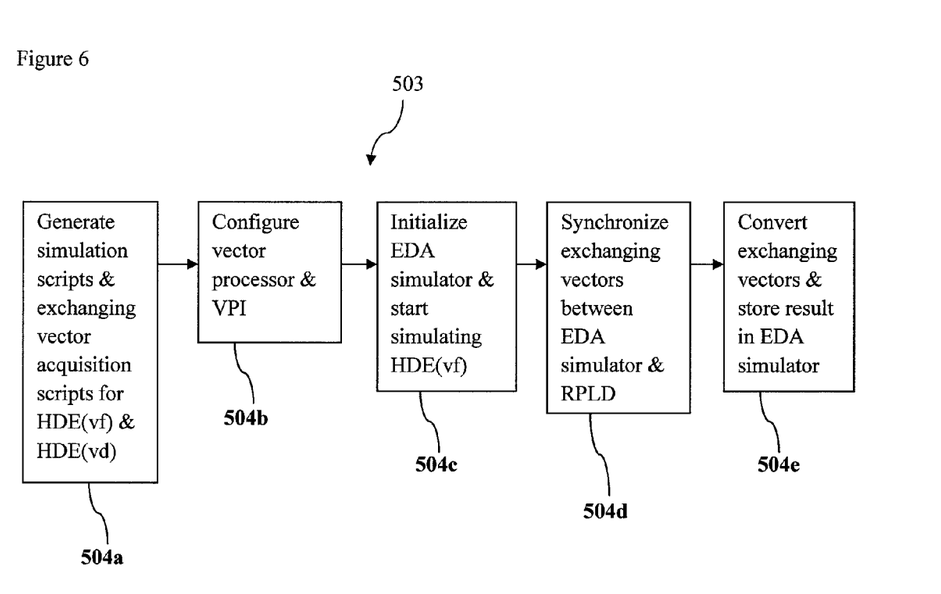
FIG. 6 depicts process flow steps of a co-emulation software that is part of the IPS executive.

FIG. 6 depicts the next level detailed process flow steps of the co-emulation software 503.

Step 504a generates simulation scripts and exchanging vector acquisition scripts for the HDE candidates to be verified and validated.

Step 504b configures the vector processor 506 and the VPI 112 into proper states.

Step 504c initializes the EDA simulator 300 into a proper state and starts simulating the selected HDEs (such as $HDE(Vf)_j$ 26a).

Step 504d synchronizes, using the VPM 504 and via the co-emulation busing mechanism, exchanging vectors 122 between the EDA simulator 300 and the RPLD 100.

Step 504e converts the exchanging vectors 122 and stores the result in the EDA simulator 300 for later debugging and regression tests. The conversion further includes separating the exchanging vectors 122 into emulation/ simulation signal vectors, internal states, data of observation points and error alarms.

Figure 7:
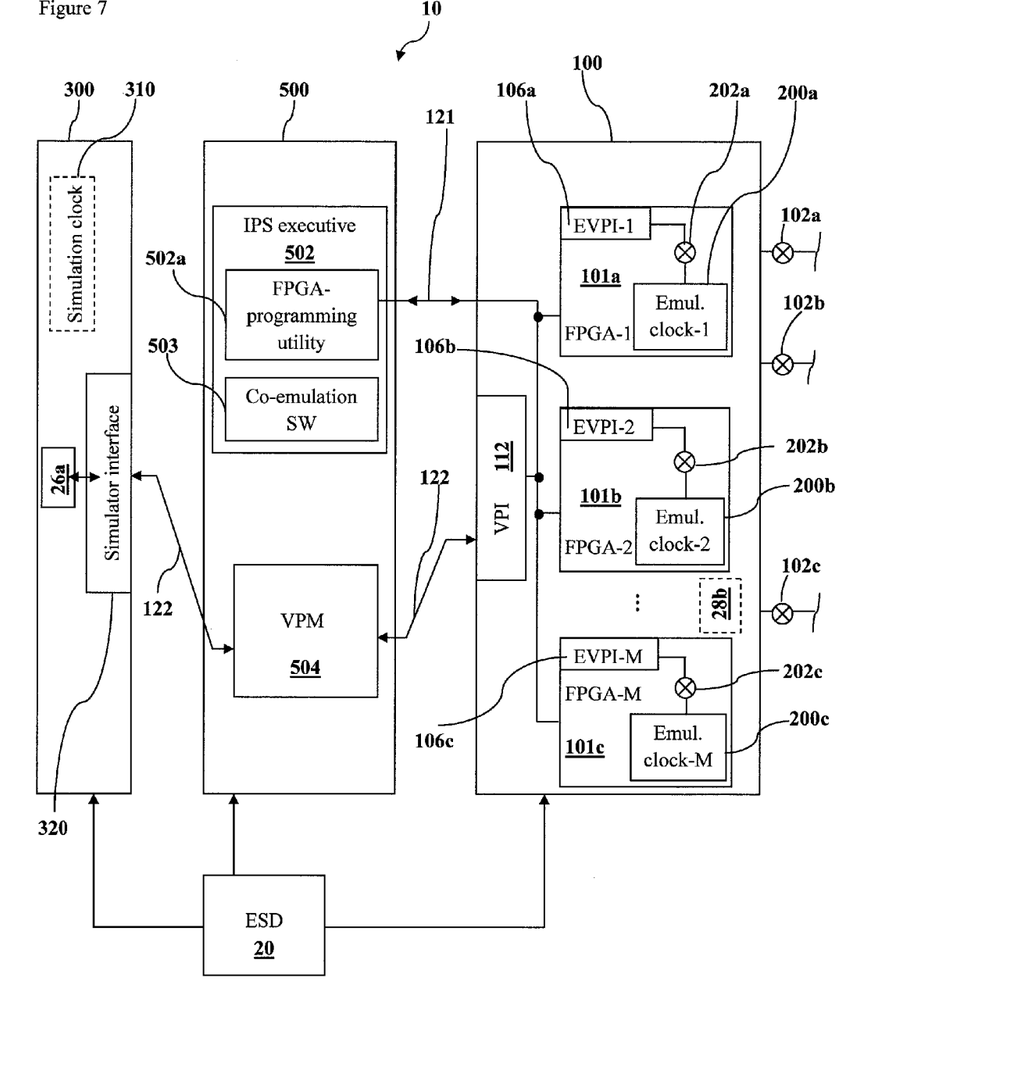
FIG. 7 illustrates further details of emulation clocking modules and an FPGA-programming utility in the IPS executive.

FIG. 7 illustrates a next level detail of numerous emulation clocking modules and an FPGA-programming utility that is part of the IPS executive.

The emulation clock-1 200a of FPGA-1 101a is switchably coupled to the EVPI-1 106a via a clock switch-1 202a. Emulation clock-1 200a plus clock switch-1 202a form a first emulation clocking module. The clock switch-1 202a is controlled by EVPI-1 106a. The emulation clock-2 200b of FPGA-2 101b is switchably coupled to the EVPI-2 106b via a clock switch-2 202b. Emulation clock-2 200b plus clock switch-2 202b form a second emulation clocking module. The clock switch-2 202b is controlled by EVPI-2 106b. Likewise, the emulation clock-M 200c of FPGA-M 101c is switchably coupled to the EVPI-M 106c via a clock switch-M 202c that in turn is controlled by EVPI-M 106c. Emulation clock-M 200c and clock switch-M 202c form a third emulation clocking module. In this way, the switchable emulation clocks 200a, 200b, 200c enable either of the following modes of co-emulation by the IPS 10:

a) A simulator-dominate mode wherein each FPGA, while being decoupled from its associated PEDs, co-emulates selected members of HDEs in conjunction with the EDA simulator 300.

b) An RPLD-dominate mode wherein each FPGA, while being coupled to its associated PEDs, emulates selected members of HDEs in conjunction with the EDA simulator 300.

Regarding the above modes, it is further pointed out that in mode a) HDE(Vd)$_k$ 28b is driven, through EVPI-1 106a and the co-emulation busing mechanism, by a virtual simulation clock with clock cycle equivalent to the simulation clock 310. However, in mode b) HDE(Vd)$_k$ 28b and EVPI-1 106a are both driven by emulation clock-1 200a. The RPLD-interface 120 further includes an FPGA-programming interface 121 for receiving information effecting a proper configuration and programming of the FPGAs 101a, 101b, 101c. Correspondingly, the IPS executive 502 further includes an FPGA-programming utility 502a that combines a set of HDEs verified by the EDA simulator 300 with a set of HDEs validated by the RPLD 100 into a next set of HDEs to be validated. The FPGA-programming utility 502a then maps the next set into configuration and programming information and sends the result through the FPGA-programming interface 121 to program the next to be validated HDE set, together with their applicable interconnection to corresponding PEDs, into the FPGAs. The FPGA-programming utility 502a further generates, maps and sends proper configuration information through the FPGA-programming interface 121, thus programming the EVPIs and VPI 112 to effect the event-based synchronization for interchanging exchanging vectors 122. While combining the verified HDEs with the validated HDEs, the FPGA-programming utility 502a further embeds the VIPs and OBPs into an area of the HDEs to be validated.

Figure 8:
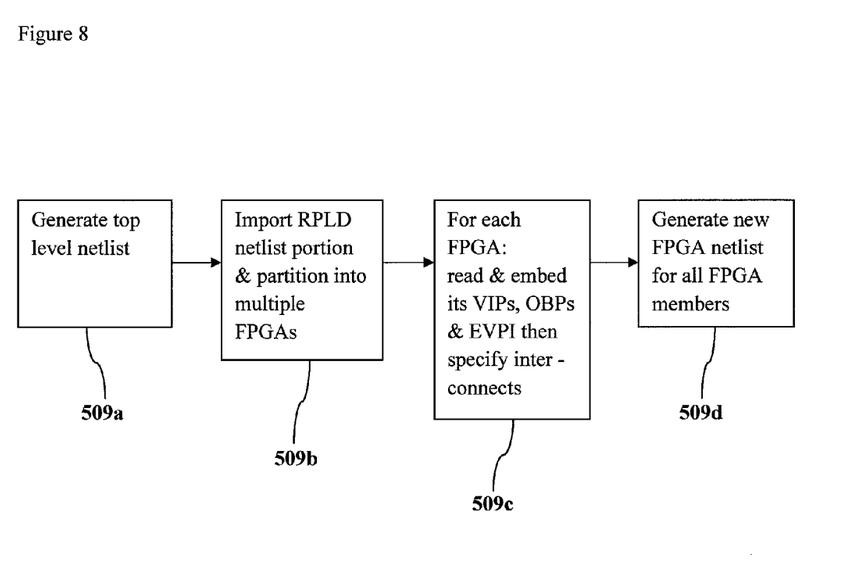
FIG. 8 depicts a portion of the FPGA-programming utility process flow steps.

FIG. 8 depicts process details while the FPGA-programming utility 502a maps the next set of HDEs to be validated into configuration and programming information:

a) Step 509a generates a top level netlist. The top level netlist has an EDA simulator portion and an RPLD portion, respectively corresponding to HDE interconnections of the EDA simulator 300 and the RPLD 100.

b) Step 509b imports the RPLD netlist portion and partitions it, if needed, into one or more FPGAs according to their FPGA attributes.

c) For each FPGA, step 509c reads and embeds its user specified or automatically generated VIPs, OBPs and EVPI and then specifies their interconnects.

d) Step 509d generates a new FPGA netlist including all individual FPGA designs.

In the above step 509b, partitioning the RPLD netlist portion into one or more FPGAs further includes:

b1) Reading the FPGA attributes and the RPLD netlist portion.

b2) Deciding, partitioning and mapping, if needed, the HDEs to be validated into one or more FPGAs.

Figure 9:
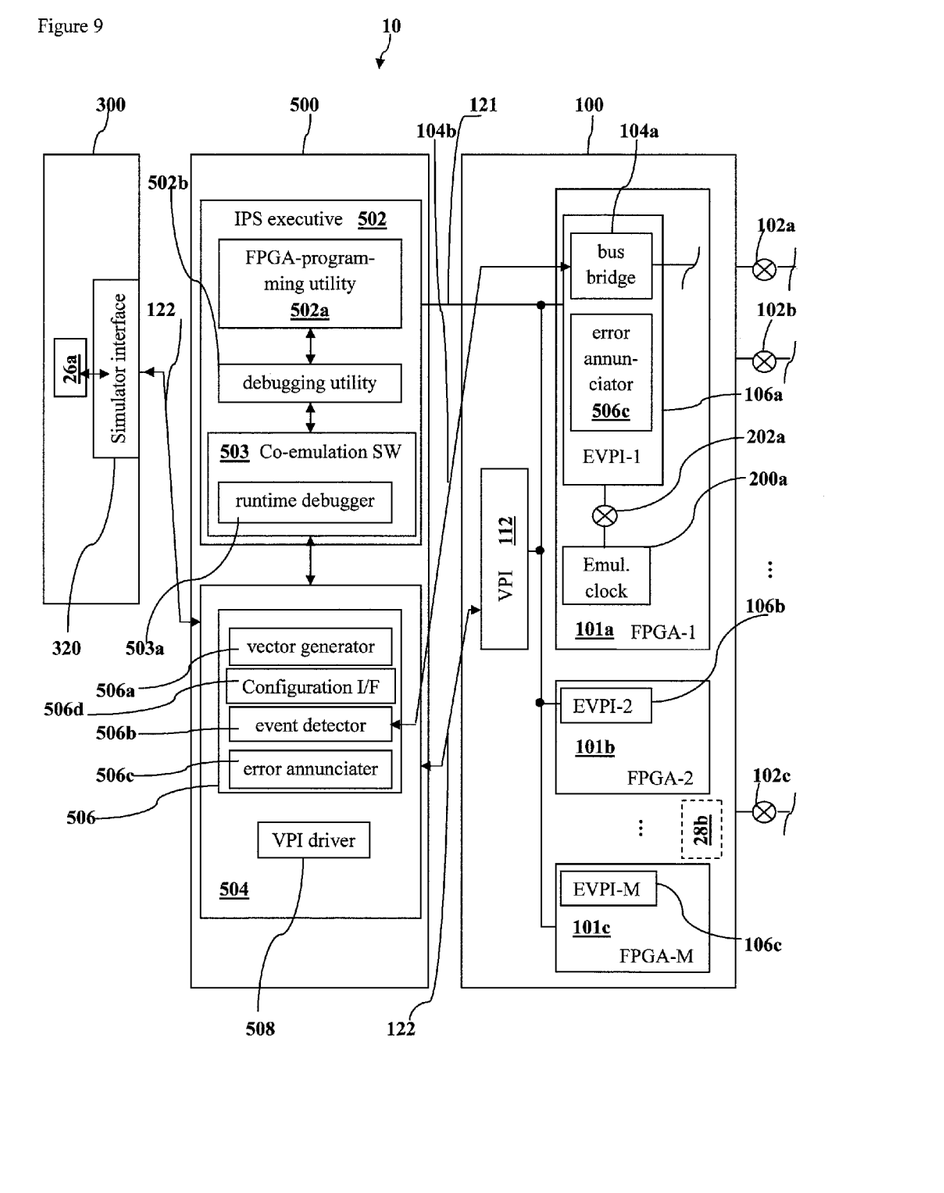
FIG. 9 illustrates the inclusion of a debugging utility, a runtime debugger, an error annunciator for detecting and fixing bugs in the ESD during the co-emulation process.

FIG. 9 illustrates the inclusion of a debugging utility 502b, a runtime debugger 503a being part of the co-emulation software 503, an error annunciator 506c for detecting and fixing bugs in the ESD 20 during the co-emulation process. The debugging utility 502b is coupled to the co-emulation software 503 and the FPGA-programming utility 502a. Upon encountering an exchanging vector 122 indicating an error in the co-emulation process, the error annunciator 506c would generate an error alarm. Upon detecting an error alarm, the runtime debugger 503a, being coupled to the error annunciator 506c, intercepts the exchanging vectors 122 indicating error from the VPM 504 side. Data relating to simulation vector, internal states, data path and error alarms, as isolated from the intercepted exchanging vectors 122 together with the VIPs and OBPs, allow the runtime debugger 503a to analyze and to isolate faults of the ESD 20.

Figure 10:
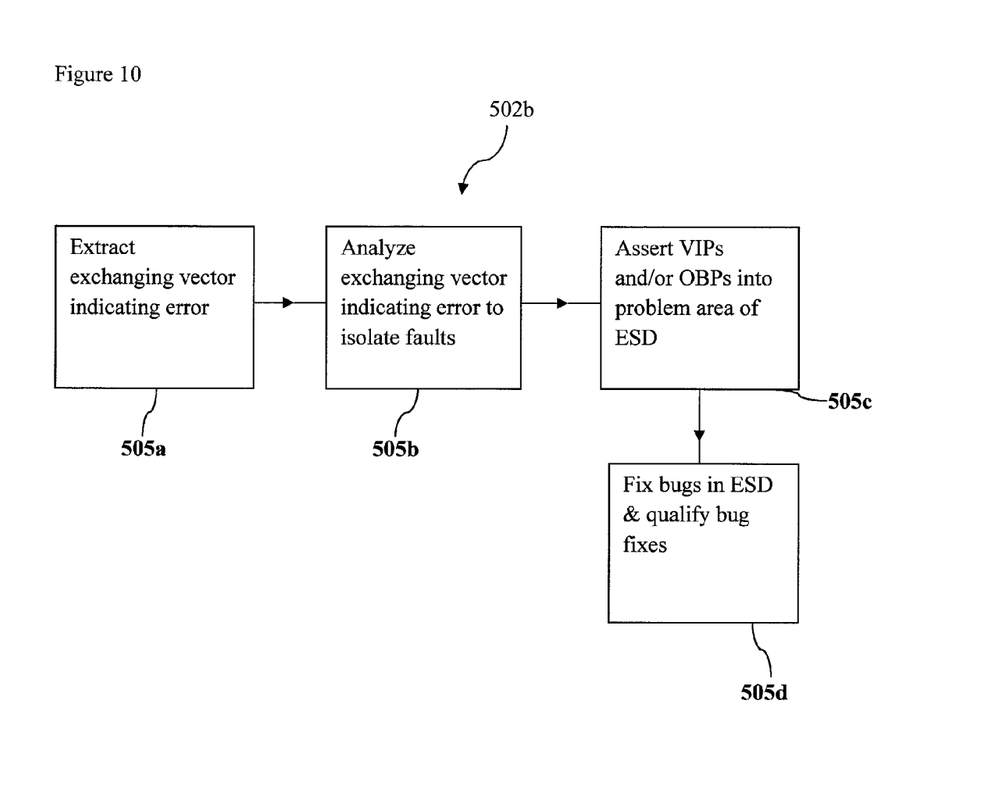
FIG. 10 depicts process flow steps for the debugging utility.

FIG. 10 depicts process flow steps for the debugging utility 502b:

a) Step 505a extracts the exchanging vectors 122 indicating error from the runtime debugger 503a.

b) Step 505b analyzes the exchanging vectors 122 indicating error, in conjunction with stored exchanging vector data from the EDA simulator 300, to isolate faults at exchanging vector boundary to accelerate the validation process.

c) Step 505c asserts, via the EDA simulator 300 or via the FPGA-programming utility 502a into the RPLD 100 as appropriate, the VIPs and/or the OBPs into a problematic area of the ESD 20 to further isolate faults if needed.

d) Step 505d fixes bugs in the ESD 20 and then, using the stored exchanging vector data from the EDA simulator 300, qualifies the associated bug fixes.

While the description above contains many specificities, these specificities should not be constructed as accordingly limiting the scope of the present invention but as merely providing illustrations of numerous presently preferred embodiments of this invention. Throughout the description and drawings, numerous exemplary embodiments were given with reference to specific configurations. It will be appreciated by those of ordinary skill in the art that the present invention can be embodied in numerous other specific forms and those of ordinary skill in the art would be able to practice such other embodiments without undue experimentation. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

We claim:

1. An integrated prototyping system (IPS) for a user to verify and validate an electronic system design (ESD) with design data provided as a plurality of hierarchical design elements HDEs each having its corresponding test bench and said HDEs further interacting with one another according to a pre-defined functional validation specification, said IPS comprising:
a) a reprogrammable logic device (RPLD) having:
an emulation timing base and an RPLD-interface for configuring, programming, controlling and monitoring a number of programmed HDEs under validation on the RPLD while receiving and outputting corresponding streams of exchanging vectors, said RPLD further switchably coupled to a plurality of external peripheral electronic devices (PED);
b) an electronic design automation (EDA) simulator for reading the design data, simulating and then verifying, while receiving and outputting corresponding streams of exchanging vectors, selected members of said HDEs in conjunction with their test benches, said EDA simulator further comprising a simulator interface for controlling said EDA simulator's execution; and
c) an IPS controller bridging the RPLD and the EDA simulator respectively through the RPLD-interface and the simulator interface, said IPS controller further comprising an IPS executive for progressively verifying and validating the design data by:
c1) partitioning the ESD into a set of validated HDEs and a set of HDE candidates each being not yet verified;
c2) verifying the HDE candidates in the EDA simulator and validating the HDE candidates in said RPLD against said functional validation specification; and
c3) repeating steps c1) and c2) till all HDE candidates are verified in the EDA simulator and validated in the RPLD against said functional validation specification.

2. The IPS of claim 1 wherein said IPS executive further progressively verifies and validates the design data according to the design hierarchy of the HDEs.

3. The IPS of claim 1 further comprising combining the verified HDE candidates with validated HDEs, and then validating the result on the RPLD.

4. The IPS of claim 1 wherein said RPLD-interface further comprises a Vector Processor Interface (VPI) for communication therewith and, correspondingly, said IPS controller further comprises a Vector Processor Module (VPM) having a vector processor and a VPI driver software for processing exchanging vectors and communicating with both the VPI and the simulator interface.

5. The IPS of claim 4 wherein said RPLD further comprises a plurality of interconnected field programmable gate arrays (FPGAs), each having its own FPGA attributes, for emulating a number of verified HDE candidates programmed therein, each FPGA further comprises an emulation clocking means, being part of the emulation timing base, for supplying a real-time scalable frequency clock timing the emulation under either:
1) a simulator-dominate mode wherein said each FPGA co-emulates selected members of HDE candidates in conjunction with the EDA simulator; or
2) an RPLD-dominate mode wherein said each FPGA, while being coupled to one or more peripheral electronic devices (PEDs), emulates selected members of HDE candidates in conjunction with the EDA simulator.

6. The IPS of claim 4 wherein said VPI further comprises a set of RPLD configuration interface, cross trigger interface and configurable clock interface.

7. The IPS of claim 4 wherein the simulator interface further comprises a computer interface for communicating with the VPM.

8. The IPS of claim 4 wherein, for verifying and validating the HDE candidates, said IPS executive further comprises a co-emulation software interacting with said VPM for jointly and simultaneously running the RPLD and the EDA simulator using an event-based synchronization for interchanging exchanging vectors on demand there between and, correspondingly, said vector processor further comprises an event detector and a vector generator for detecting relevant events from either HDE candidates under verification or HDE candidates under validation, generating and flagging properly formatted exchanging vectors requested by the co-emulation software.

9. The IPS of claim 8 further comprising a co-emulation busing means for data busing between HDE candidates under verification and HDE candidates under validation and wherein said co-emulation software further comprises:
1) generating simulation scripts and exchanging vector acquisition scripts for the HDE candidates to be verified and validated;
2) configuring the vector processor and the VPI into proper states;
3) initializing the EDA simulator into a proper state and starting simulating the selected HDE candidates;
4) synchronizing, using the VPM and via the co-emulation busing means, exchanging vectors between the EDA simulator and the RPLD; and
5) converting the exchanging vectors and storing the result eventually in the EDA simulator for later debugging and regression tests.

10. The IPS of claim 9 wherein converting the exchanging vectors further comprises extracting emulation/simulation signal vectors, internal states, data of observation points and error alarms from the exchanging vectors.

11. The IPS of claim 4 wherein said FPGAs are switchably coupled to the PEDs and each FPGA is further configured to have an individual Embedded Vector Processor Interface (EVPI) interfacing with the VPI and the emulation clocking means for:
a) transceiving exchanging vectors; and
b) embedding desired Verification IPs (VIPs) and observation points (OBPs) into an area of the verified HDEs under validation on the RPLD to catch faults during a co-emulation process.

12. The IPS of claim 11 wherein said vector processor and said EVPI further comprise an error annunciator.

13. The IPS of claim 11 wherein:
a) said RPLD-interface further comprises an FPGA-programming interface for receiving information effecting a proper configuration and programming of said plurality of interconnected FPGAs; and correspondingly
b) said IPS executive further comprises an FPGA-programming utility that combines a set of HDE candidates verified by the EDA simulator with a set of HDEs validated by the RPLD into a next set of HDE candidates to be validated, maps said next set of HDE candidates to be validated into configuration and programming information, and then sends the result through the FPGA-programming interface, thus programming the next set of HDE candidates to be validated, together with applicable interconnection to corresponding PEDs, into the plurality of FPGAs.

14. The IPS of claim 13 wherein said FPGA-programming utility further generates, maps and sends proper configuration information through the FPGA-programming interface thus programs the EVPI and VPI whereby effects the event-based synchronization for interchanging exchanging vectors.

15. The IPS of claim 14 wherein said FPGA-programming utility, while combining the just verified HDE candidates with the just validated HDEs, further embeds the VIPs and OBPs into a problematic area of the HDE candidates to be validated.

16. The IPS of claim 15 wherein mapping the next set of HDE candidates to be validated into configuration and programming information further comprises:
   a) generating a top level netlist, having an EDA simulator portion and an RPLD portion, respectively corresponding to HDE interconnections of the EDA simulator and the RPLD;
   b) importing and partitioning the RPLD netlist portion into one or more FPGAs according to their FPGA attributes;
   c) for each FPGA, reading and embedding its user specified or automatically generated VIPs, OBPs and EVPI then specifying its interconnects; and
   d) generating a new FPGA netlist comprising individual FPGA designs.

17. The IPS of claim 16 wherein partitioning the RPLD netlist portion into one or more FPGAs further comprises:
   b1) reading the FPGA attributes and the RPLD netlist portion; and
   b2) deciding, partitioning and mapping the HDE candidates to be validated into one or more FPGAs.

18. The IPS of claim 11 wherein, for detecting bugs in the ESD:
   a) upon encountering an exchanging vector indicating an error in the co-emulation process, said error annunciator generates an error alarm; and
   b) said co-emulation software further comprises a runtime debugger coupled to the error annunciator for, upon detecting the error alarm, intercepting said exchanging vector indicating error from the VPM.

19. The IPS of claim 18 wherein said IPS executive further comprises a debugging utility coupled to the co-emulation software and the FPGA-programming utility for:
   a) extracting said exchanging vector indicating error from the runtime debugger;
   b) analyzing the exchanging vector indicating error, in conjunction with stored exchanging vector data from the EDA simulator, to isolate faults at exchanging vector boundary to accelerate the validation process;
   c) asserting, via the EDA simulator or via the FPGA-programming utility into the RPLD as appropriate, said VIPs and/or said OBPs into an area of the ESD to further isolate faults; and
   d) fixing bugs in the ESD then using the stored exchanging vector data from the EDA simulator to qualify the associated bug fixes.

20. An integrated prototyping system (IPS), comprising:
   a logic simulator having a simulator interface for (a) receiving a first set of design elements of an electronic device to be simulated in the logic simulator, (b) receiving test vectors for the design elements under simulation, and (c) providing output vectors from the design elements under simulation;
   an emulation system including one or more programmable logic devices having an emulation system interface for (a) allowing a second set of design elements of an electronic device to be configured and emulated in the programmable logic devices, (b) receiving test vectors to be applied to the design elements configured in the programmable logic devices, and (c) providing output vectors from the design elements configured in the programmable logic devices; and
   a controller having access to both the emulation system interface and the simulator interface, wherein the controller progressively verifies and validates the electronic device against a specification by:
      (a) partitioning design elements of the electronic device into the first design elements and a set of validated design elements;
      (b) (i) providing, over the simulator interface, the first set of design elements and corresponding test vectors to the logic simulator over the simulator interface for simulation and (ii) providing, over the emulation system interface, selected members of the first set of design elements that have been simulated as the second set of design elements, the second set of design elements being provided to be configured in the programmable logic device for emulation using corresponding test vectors;
      (c) (i) receiving, over the simulator interface the output vectors of the design elements under simulation, (ii) receiving, over the emulation system interface, the output vectors of the designed elements configured in the programmable logic devices, and (iii) synthesizing next test vectors for the design elements under simulation and for the design elements configured in the programmable logic devices; and
      (d) repeating steps (a)-(c) until the requirements of the specification are satisfied.

21. The IPS of claim 20 wherein the specification includes verification and validation requirements for each design element, and wherein the controller, upon a design element in the first set of design elements satisfying the corresponding verification requirement, moves the design element into the second set of design elements for emulation in the programmable logic devices.

22. The IPS of claim 20, wherein the emulation system interface comprises a Vector Processor Interface (VPI) which communicates with a Vector Processor Module (VPM) in the controller which processes the test vectors and the output vectors provided to and received over the simulator interface and the emulation system interface.

23. The IPS of claim 22, wherein the programmable logic devices comprise FPGAs.

24. The IPS of claim 22, wherein the VPM in the controller further comprises a host interface for communicating with a host computer.

25. The IPS of claim 22, wherein the IPS controller executes co-emulation software which allows the VPM to simultaneously control the simulation in the logic simulator and the emulation in the emulation system.

26. The IPS of claim 22, wherein said VPM further comprises an error annunciator.

27. The IPS of claim 20, wherein the emulation system and the logic simulator use an event-based synchronization mechanism.

28. The IPS of claim 20, wherein the emulation system enables the design elements configured in the programmable logic devices to interact with one or more external peripheral devices.

29. The IPS of claim 20, wherein the design elements of the electronic device are provided to the emulation system in the form of a binary file created by compiling one or more netlists representing the design elements of the electronic device.

* * * * *